United States Patent

[11] 3,596,050

| [72] | Inventor | George H. Tikijian<br>South Orange, N.J. |
|---|---|---|
| [21] | Appl. No. | 33,153 |
| [22] | Filed | May 5, 1970 |
| [45] | Patented | July 27, 1971 |
| [73] | Assignee | Union Carbide Corporation<br>Continuation of application Ser. No.<br>688,424, Dec. 6, 1967, now abandoned. |

[54] AUTOMATIC TORCH HEIGHT CONTROL
2 Claims, 3 Drawing Figs.

[52] U.S. Cl.................................................. 219/131,
228/10, 219/12
[51] Int. Cl................................................. B23k 9/10
[50] Field of Search......................................... 219/131 R,
131 F, 131 WR, 21, 135, 124, 125; 318/20.070, 9;
228/10

[56]  References Cited
UNITED STATES PATENTS

| 2,866,145 | 12/1958 | Peaslee et al. | 318/563 |
| 3,398,342 | 8/1968 | Redman | 318/650 |

Primary Examiner—J. V. Truhe
Assistant Examiner—J. G. Smith
Attorneys—Paul A. Rose, Thomas I. O'Brien and Lawrence G. Kastriner ABSTRACT: The height control apparatus of the present invention automatically maintains a desired spacing between a torch and the surface of a workpiece by detecting variations in capacitance between a plate attached to the torch and the workpiece, and by comparing the variations with a reference signal which represents the desired spacing, the compared signal output controlling torch-positioning means for returning the torch to the desired height.

INVENTOR
GEORGE H. TIKIJIAN

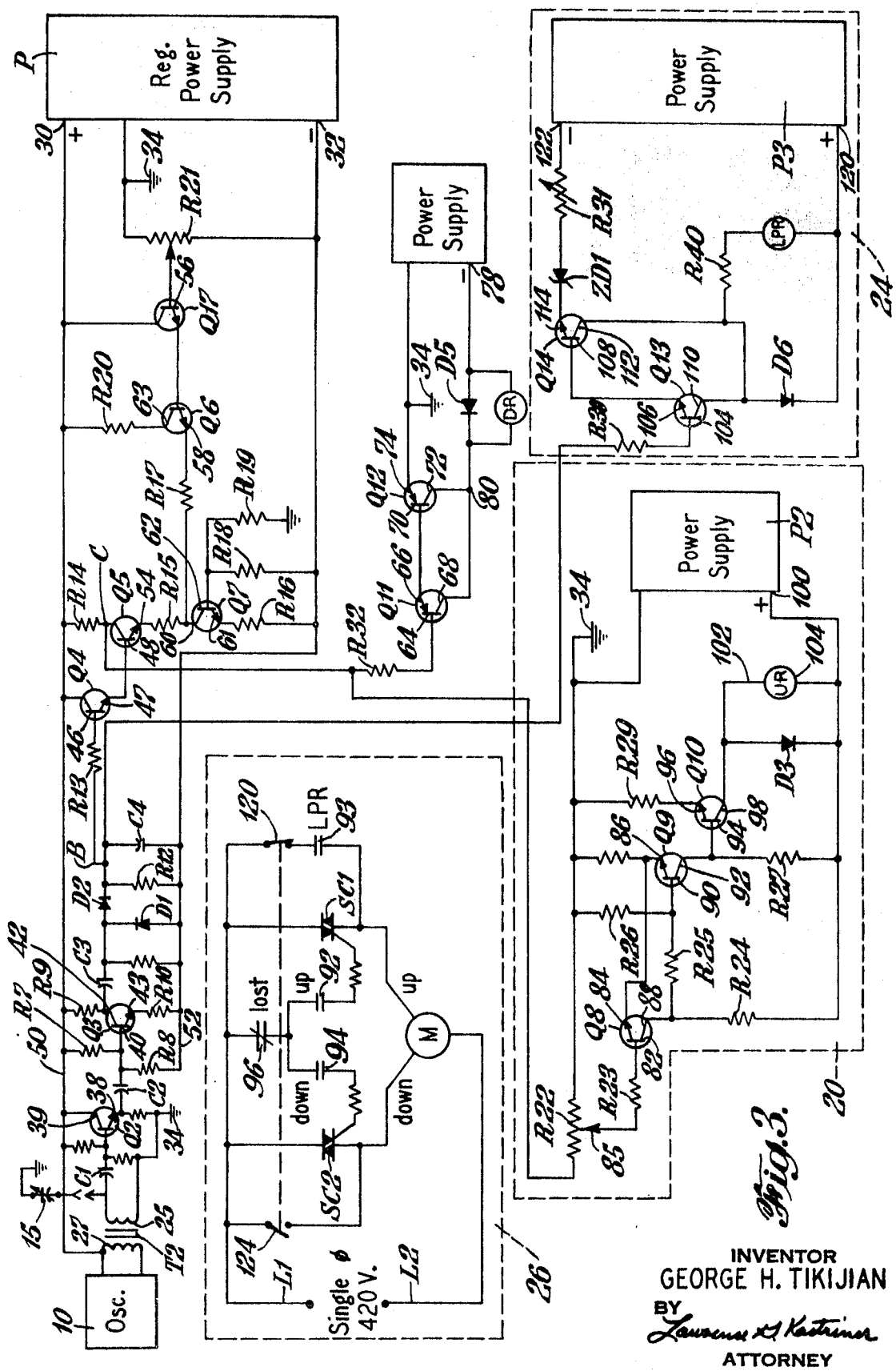

AUTOMATIC TORCH HEIGHT CONTROL

This application is a continuation of U.S. application Ser. No. 688,424, filed Dec. 6, 1967, now abandoned.

BACKGROUND OF INVENTION

This invention relates to automatic height control apparatus for cutting and welding machines, and more particularly to an electronic height control for automatically maintaining predetermined spacing during cutting or welding operations between a torch and the surface of a workpiece.

In cutting and welding with a heating torch, it is desirable to maintain the torch to work distance constant. Height control means for directly sensing and correcting variations in height are of the mechanical, optical, or electronic type. We are concerned here exclusively with the last type of height control.

In U.S. Pat. No. 2,747,152 there is disclosed an electronic height control system employing a height-sensing probe which is either an inductor or a capacitor. The probe is attached to a cutting torch which is adjusted to operate at some suitable height above the workpiece, and is excited by a high-frequency signal creating a magnetic field about the probe. The spacial orientation of the magnetic field about the probe varies as the torch to work distance changes. A variation in the magnetic field will cause the reactance of the probe to change. Changes in the reactance of the probe are converted into an electrical signal which in turn is applied to a torch-positioning mechanism to bring the torch back to its original height above the workpiece.

The accuracy of the above electronic control depends upon how well the probe is isolated from outside interferences such as fields produced by other electronic controls as well as stray capacitance. External magnetic fields will influence and interfere with the magnetic field produced about the probe. The magnetic field of the probe is also seriously affected by the physical properties of the material that is being worked upon. Materials which differ in their permeability and resistivity characteristics will have different effects upon the magnetic field.

Other prior art electronic height control systems as well as the one referred to hereinabove, suffer also from operator adjustment difficulties. The height adjustment is carried out at a high signal frequency which is a delicate operation. Other required adjustments, such as sensitivity and lost plate are interrelated with the height adjustment. When one adjustment is made it affects the others requiring constant and careful readjustment of all settings. Continuous attention by the operator must therefore be given to the control settings to keep them properly adjusted for satisfactory regulation.

SUMMARY OF THE INVENTION

The above disadvantages are overcome in the present invention wherein the electronic height control apparatus comprises a high frequency excited sensor circuit which includes a coil and a capacitor. The capacitor is defined by two parallel plates with one plate representing the workpiece and the other plate being mounted on the torch for movement therewith. The combination of coil and capacitor forms a tuned circuit which is excited by a high frequency signal source. The resonant frequency of the tuned circuit depends upon the physical separation between the plates of the capacitor. The physical separation between the capacitor plates is the equivalent of the torch to work distance. A variation in the physical separation of the plates changes the output voltage of the tuned resonant circuit. This output voltage is then converted to a DC control voltage which is compared to a selectively variable DC control signal voltage adjustable by the operator. The difference between the two signals is supplied to torch-positioning circuit means for correcting the variation.

The present invention provides for height adjustment control at DC and as such permits the operator to vary the separation between the torch and workpiece independent of other adjustments, such as sensitivity and lost plate. The setting of the height adjustment control by the operator represents the height to be maintained constant automatically.

The present height control apparatus is unaffected by neighboring electronic controls, such as would exist in a multiple torch arrangement where each torch possesses an individual electronic height control unit. In fact, the additional controls may operate at the same high signal frequency with no noticeable effect upon each other. In addition, the height control apparatus of this invention is unaffected by the physical characteristics of the workpiece, provided of course, that the workpiece is of conductive material so that it may act as a capacitor plate.

The present invention further provides a null or sensitivity adjustment control which is independent of the height adjustment control.

Additionally, the present invention provides a lost plate control, independent of the height setting provided by the height adjustment control and the sensitivity setting provided by the sensitivity adjustment control, which will automatically retract the torch to a preset lost plate height should the torch be driven completely off the plate or workpiece.

OBJECTS

It is the primary object of this invention to provide an improved automatic electronic height control which is highly accurate and reliable.

It is a further object of this invention to provide an automatic height control which can operate in a multiple torch arrangement without interference from other height controls operating at the same or other frequencies.

It is a further object of this invention to provide an electronic height control where the adjustments are all independent of one another and are simple to perform.

THE DRAWINGS

These and other advantages of this invention will become apparent to those skilled in the art on consideration of the accompanying specification, claims and drawings in which:

FIG. 3 is the electrical circuit schematic diagram of FIG. 1.

DETAILED DESCRIPTION

Figure 1:
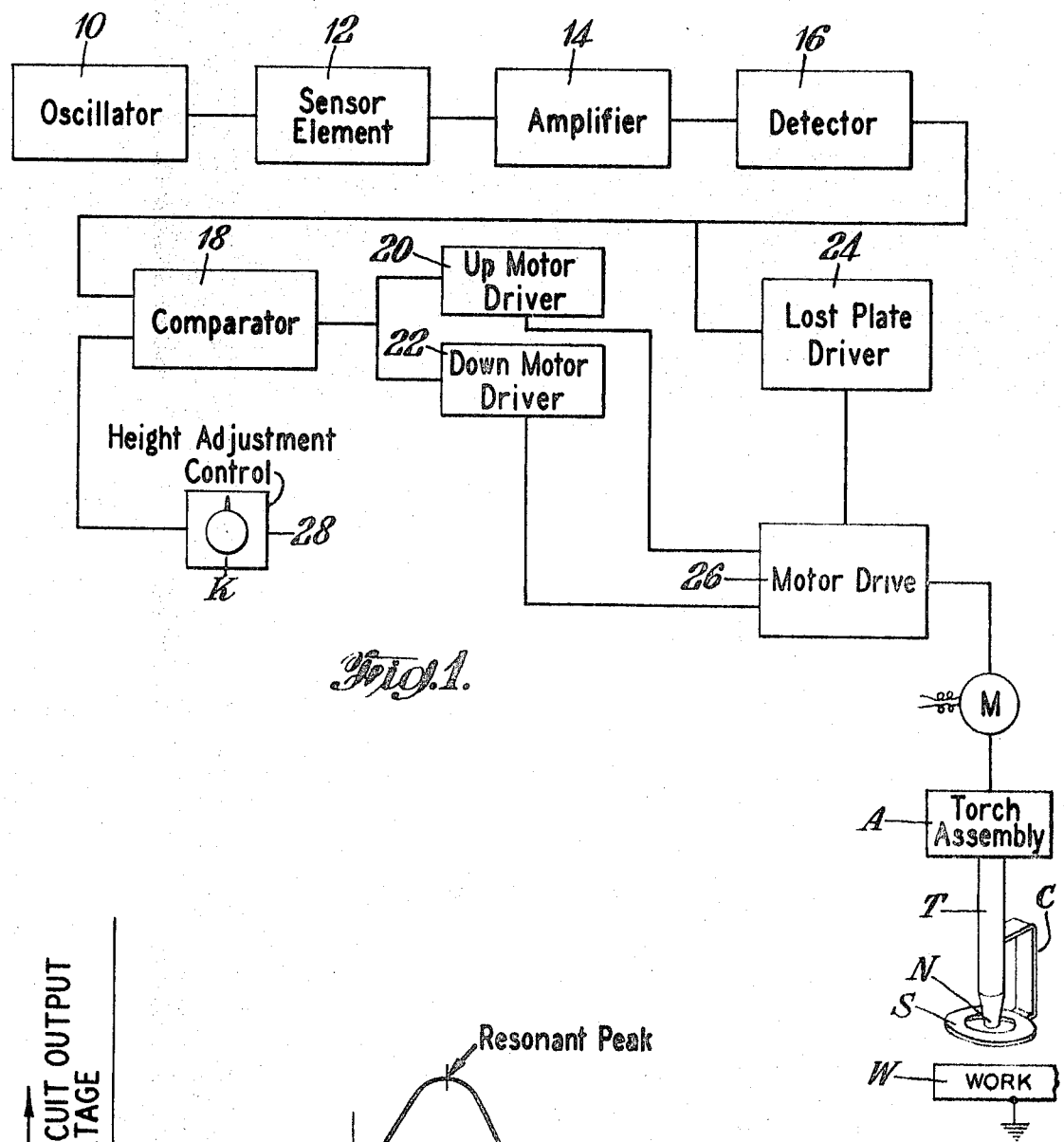
FIG. 1 is a block diagram of the height control of the present invention.

Referring to FIG. 1, a torch T is shown having a cutting nozzle N located above workpiece W. The torch T is slideable mounted in the torch assembly A for movement toward or away from the workpiece W in a plane perpendicular to workpiece W. The torch may be manually raised or lowered (by means of apparatus not shown) or electronically controlled for up and down movement by way of the height control apparatus of the present invention. Separate means not shown are employed to drive the torch or workpiece in a horizontal direction relative to one another to perform the cutting or welding operation.

Torch T has firmly secured thereto a sense shoe S by means of clamp C which is insulated from torch T so as not to make electrical contact therewith. Sense shoe S preferable surrounds either entirely or partially (as in a horse shoe configuration) the cutting nozzle N of torch T and is arranged flush with the mouth or orifice of the cutting nozzle N in a plane substantially parallel to the surface of workpiece W. With this physical arrangement the distance between the tip of torch T i.e. the orifice of cutting nozzle N, and the surface of workpiece W is equivalent to the distance between the sense shoe S and the surface of workpiece W. The workpiece W is generally plate steel, but may consist of any material which is electrically conductive. Sense shoe S must also consist of a material which is electrically conductive but need not be identical in composition to that of workpiece W.

The sense shoe S and the workpiece W are substantially parallel to one another and form a pair of capacitor plates which together serve as an element of the sensor circuit. The sensor circuit is accordingly hereinafter defined as a combination of sensor element 12 of FIG. 1 and the sensor element comprising the capacitor plates formed by sense shoe S and workpiece W.

Figure 2:
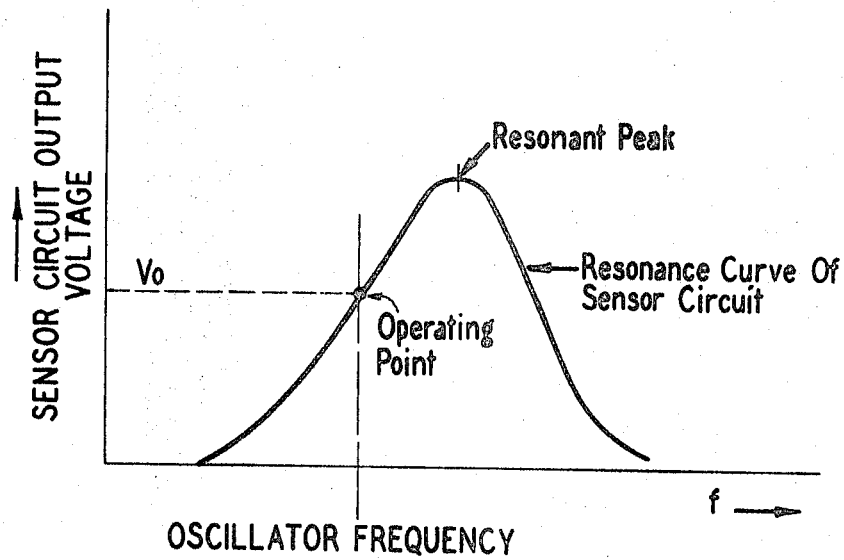
FIG. 2 is a graph of the resonance characteristic curve of the sensor circuit of FIG. 1.

The sensor circuit forms a tuned parallel resonance circuit which displays a resonance frequency characteristic curve as illustrated in FIG. 2. As FIG. 2 demonstrates, the sensor circuit produces an output voltage for an input frequency signal within its bandwidth or frequency range. The output voltage will increase with increasing frequency to the left of the resonant peak and will decrease with a further increase in frequency to the right of the resonant peak.

Oscillator 10 of FIG. 1 is a continuous wave high-frequency oscillator of conventional design. The design criterion for oscillator 10 is that it provide a stable output frequency which may be varied within the frequency range of the sensor circuit. The output of oscillator 10 is applied to the sensor circuit. The output frequency of the oscillator is adjusted such that when the torch T is at the desired height above the workpiece W the oscillator frequency is displaced either on the left or right side of the resonant peak, preferably in the linear range of the slope of the resonance curve in FIG. 2. If the output frequency is adjusted to the frequency location or operating point shown in FIG. 2, the output of the sensor circuit will be a voltage equal to Vo. Accordingly, the voltage Vo represents the desired torch to work spacing. Any vertical movement of the torch T relative to the workpiece W causes a like movement of sense shoe S relative to the workpiece and an accompanying change in capacitance between sense shoe S and workpiece W. The change in capacitance is reflected on the resonance characteristic curve as a shift along the slope of the curve in both voltage and frequency about the operating point. The direction the shift will take will depend upon the direction of movement of the torch with respect to the workpiece. Either the voltage variation or frequency variation or a combination thereof can be applied to correct the torch movement to maintain a constant spacing between the torch T and workpiece W. Although both voltage variation and frequency variation may be employed, voltage variation is preferred as will become clearly apparent from the following description of the invention.

The output of the sensor circuit is amplified in amplifier 14 of FIG. 1 and applied to detector 16. Detector 16 converts the amplified output to a DC voltage whose magnitude varies linearly with variations in sensor circuit output. The voltage output of detector 16 is applied to comparator 18, the function of which is to compare this voltage with a DC reference input voltage from the height adjustment control 28. The reference voltage is manually adjustable through control knob K and is originally preset by the operator to represent the desired torch to work spacing as will be more fully discussed hereinafter. The output of comparator 18 will then be a DC voltage which is of a positive or negative polarity. That is, the output voltage of comparator 18 will represent the difference between the reference voltage produced from height adjustment control 28 and the voltage output of detector 16 which will necessarily be either positive or negative depending upon whether the voltage output of detector 16 is greater or smaller than the reference voltage of height adjustment control 28. The output of comparator 18 is applied simultaneously to the up motor driver 20 and to the down motor driver 22. Motor driver 20 and 22 act in response to the comparator output to actuate motor drive circuit 26 thereby raising or lowering torch T by means of motor M until the output voltage of detector 16 equals the height adjustment reference voltage.

A complete circuit diagram of the height control system of FIG. 1 is shown in FIG. 3. The capacitor plates formed by sense shoe S and workpiece W is represented by variable capacitor 15 which is connected in parallel with the secondary 25 of transformer T2 to form the tuned sensor circuit. The secondary 25 of transformer T2, which is a loosely coupled transformer, represents sensor element 12 of FIG. 1. Sensor element 12 need not be the secondary of a transformer; instead, it may be a separate coil which is placed in parallel with the variable capacitor 15 to form the tuned sensor circuit. The primary 27 of loosely coupled transformer T2 is connected to the output of oscillator 10. The output of the tuned sensor circuit is coupled through capacitor C1 to the input of transistor Q2. Transistor Q2 is arranged in an emitter-follower-type configuration providing an output at its emitter 38 with respect to ground 34. The collector 39 of transistor Q2 is connected by means of conductor 50 to the positive terminal 30 of the regulated power supply P. The output of the cathode follower Q2 at emitter 38 is coupled through capacitor C2 to the base 40 of transistor Q3. Transistor Q3 represents amplifier 14 of FIG. 1. The base 40 of transistor Q3 is connected to one end of biasing resistors R7 and R8. The other end of bias resistor R7 is connected to conductor 50 which is in turn connected to the positive terminal 30 of regulated power supply P. The other end of resistor R8 is connected to conductor 52 which is in turn connected to the negative terminal 32 of power supply P. The collector 42 is connected to conductor 50 by means of collector resistor R9. The emitter 43 of transistor Q3 is connected to conductor 52 by means of resistor R10. Collector 42 is connected in series through capacitor C3 to diodes D1 and D2. Diodes D1 and D2 are arranged to provide half-wave rectification for the output signal of transistor Q3. Across the halfway rectifier is a capacitor filter consisting of capacitor C4 and resistor R12. The combination of half-wave rectifier and capacitor filter comprise the detector 16 of FIG. 1. The output of the halfway rectifier filter combination at point B is connected through resistor R13 to the base 46 of transistor Q4. The emitter 47 of transistor Q4 is connected to base 48 of transistor Q5. Transistor Q4 in combination with transistor Q5 form what is known to the art as a darlington-type current amplifier. In such an arrangement a variation in the input is amplified by the product of the amplification factor of each transistor. Transistors Q6 and Q17 likewise form a darlington current amplifier arrangement with Q6 identical to transistor Q4 and Q17 identical to transistor Q5. Base 56 of transistor Q17 is connected to a variable potentiometer R21. R21 is connected at one end to ground terminal 34 of power supply P and at the other end to negative terminal 32. Potentiometer R21 represents the height adjustment control 28 of FIG. 1 and is manually controllable by the operator. Emitter 54 of transistor Q5 is connected through resistor R15 to collector 60 of transistor Q7. Emitter 58 of transistor Q6 is connected by means of resistor R17 to collector 60 of transistor Q7. Resistor R15 and resistor R17 are identical. Transistor Q7 has its emitter 61 connected through resistor R16 to the negative terminal 32 of the power supply P and its base 62 connected to one end of resistor R18 and one end of resistor R19. The other end of resistor R18 is connected to the negative terminal 32 of power supply P while the other end of resistor R19 is connected to ground terminal 34 of power supply P. Transistor Q7 represents a constant current source for transistors Q5 and Q6. Collector C of transistor Q5 is connected through resistor R14 to conductor 50 which is connected to the positive terminal 30 of power supply P. Collector 63 of transistor Q6 is likewise connected to conductor 50 by means of resistor R20. Resistor R20 is identical to resistor R14. The combination of transistors Q4, Q5, Q6, Q17 and Q7 comprises comparator 18 of FIG. 1. The output of the comparator 18 is taken at collector C of transistor Q5.

Collector C of transistor Q5 is connected simultaneously to the up motor driver circuit 20 and to the down motor driver circuit 22. The up motor driver circuit 20 is shown in FIG. 2 blocked off with dotted lines. Down motor driver circuit 22 includes transistor Q11 and transistor Q12. The base 64 of transistor Q11 is connected through resistor R32 to collector C of transistor Q5. The collector 68 is connected to the collector 72 of transistor Q12 at junction point 80 while the emitter 66 of transistor Q11 is connected to the base 70 of transistor Q12. The emitter 74 of transistor Q12 is connected to the ground terminal 34 of power supply P1. Ground terminal 34 is common to all circuits and represents the common ground for power supplies P, P1, P2 and P3. Power supply P1 may be an unregulated power supply. The negative terminal 78 of power supply P1 is connected to one end of the down relay DR. The other end of the down relay DR is connected to junction point 80. Across the down relay is diode D5.

The up motor driver circuit 20 includes transistors Q8, Q9 and Q10 respectively. The arrangement of Q8, Q9 and Q10 define what is commonly known in the art as a Schmidt trigger circuit. The collector C of transistor Q5, the output of comparator circuit 18 of FIG. 1 is connected to one end of variable potentiometer R22 while the other end of variable potentiometer R22 is connected to the ground terminal 34 of power supply P2. Power supply P2 may also be an unregulated power supply. Variable potentiometer R22 represents the sensitivity adjustment control which is manually controlled by the operator. Transistor Q8 has its base 82 connected through resistor R23 to variable wiper arm 85 of potentiometer R22. The emitter 84 of transistor Q8 is connected to the emitter 86 of transistor Q9. The collector 88 of transistor Q8 is connected through resistor R25 to the base 90 of transistor Q9 and also to the positive terminal 100 of power supply P2 through resistor R24. The base 90 of transistor Q9 has a biasing resistor R26 which is connected to ground terminal 34 on power supply P2. The collector 92 of transistor Q9 is connected to the positive terminal 100 of power supply P2 through resistor R27 and is also connected to the base 94 of transistor Q10. The emitter 96 of transistor Q10 is connected to the ground terminal 34 of power supply P2 through resistor R29 while the collector 98 of transistor Q10 is connected to terminal 102 of the up relay UR. The other terminal 104 of up relay UR is connected to the positive terminal 100 of power supply P2. Across the up relay UR and in parallel therewith is diode D3.

The lost plate relay driver circuit 24 of FIG. 1 includes transistor Q13 and transistor Q14. The base 104 of transistor Q13 is connected directly through resistor R30 to point B the output of the detector circuit 16 of FIG. 1. The emitter 106 of transistor Q13 is connected to the base 108 of transistor Q14 while the collector 110 of transistor Q13 is connected to the collector 112 of transistor Q14 and through diode D6 to the positive terminal 120 of power supply P3. The lost plate relay LPR is connected at one end to the positive terminal 120 of power supply P3 while the other end is connected in series with resistor R40 and the collector 112 of transistor Q14. The emitter 114 of transistor Q14 is connected to the negative terminal 122 of power supply P3 through zener diode ZD1 and variable resistor R31. Variable resistor R31 represents the lost plate adjustment control which is manually adjustable by the operator. Zener diode ZD1 in series with variable resistor R31 provides insurance against an accidental energization of the lost plate relay LPR through an improper setting of the variable resistor R31. Accordingly, as will be discussed hereafter in the operation of the height control, the voltage at point B must become sufficiently great to overcome the zener voltage for energization of lost plate relay LPR. The variable resistor R31 provides the operator some flexibility in choosing the voltage at which he desires the lost plate relay LPR to energize.

The motor M is driven by motor drive circuit 26 shown blocked off with dotted lines in FIG. 3. The motor M is actuated in response to the energization of either the down relay DR, up relay UR or lost plate relay LPR. The motor M has two field windings (not shown) to cause rotation in either direction and is energized from a single-phase line source through leads L1 and L2. The motor drive circuit 26 includes two Triacs SC1 and SC2. Triac SC1 is actuated when normally opened up relay contact 92 closes while Triac SC2 is actuated when normally opened down relay contact 34 closes. In series with the down and up relay contacts 34 and 92 respectively is a normally closed lost plate relay contact 96. A second normally opened lost plate relay contact 93 is directly in series with the motor M. A pair of manually operable ganged switches 120 and 122 are shown for manually driving the motor in the down direction.

OPERATION OF THE AUTOMATIC HEIGHT CONTROL

Referring to FIGS. 1, 2 and 3, the torch T is manually positioned to the desired height above workpiece W. At this position the output voltage of the sensor circuit should be represented in FIG. 2 on the resonance characteristic curve displaced from the point of peak resonance, either on the left- or right-hand slope and preferably in the linear region of the slope. If the spacing between the torch T and work W is three-eighths inches, the output voltage of the sensor circuit should be Vo on the resonance characteristic curve. The output voltage of the sensor circuit is amplified by transistor Q3, rectified by diodes D1 and D2 and filtered to a DC voltage by means of capacitor C4 and resistor R12. Point B, the output of the rectifier filter combination will then measure some predetermined voltage which is present by adjustment of the output frequency of oscillator 10. In the present design a 3-volt measurement at point B with respect to ground 34, serves to signify that the torch is three-eighths inches above the work and that the output of the sensor circuit is at Vo in FIG. 2 on the left-hand slope of the resonant characteristic curve. Once point B measures 3 volts, no further adjustment is necessary in the oscillator 10 for the remainder of the cutting or welding operation and in fact no further adjustment should be necessary regardless of changes in the torch nozzle, speed of gas flow, or changes in the thickness of workpiece W.

The DC voltage at point B is applied as one input to comparator 18. A selectively variable reference voltage is applied as a second DC input control voltage to comparator 18 from the height adjustment control 28. The height adjustment control 28 consists of variable potentiometer R21 which is adjustable through wiper arm A by means of control knob K shown in FIG. 1. The comparator provides an output voltage at point C of FIG. 3, which is equal to the difference between the voltage at point B and the reference voltage output at the wiper arm A of variable potentiometer R21. The operator varies the output of wiper arm A until point C is zero. With this adjustment completed the height control will maintain the torch at three-eighths inches above the workpiece for the entire welding or cutting operation. If the operator should desire to change the spacing between torch T and workpiece W, he merely manually raises or lowers the torch to the height desired and readjusts the output of height adjustment control 28 for this new height setting until the voltage at point C reads zero volts with respect to ground 34. This new height will then be regulated by the height control apparatus to maintain the height constant. The height adjustment control may also be calibrated in inches representing various torch heights. In this case the operator, during the welding or cutting operation, need only vary the control K to a new setting corresponding to the desired height.

Output voltage C of comparator 18 is applied simultaneously to two circuits, the up motor drive circuit 20 and the down motor drive circuit 22. With zero-voltage output at point C with respect to ground 34 up relay UR in the up motor drive circuit 20 as well as down relay DR in the down motor drive circuit 22 are normally deenergized.

Under normal operation, assume that the workpiece W is slightly warped having at least one convex and one concave region. As the torch T approaches a convex region the spacing between the torch T and workpiece W decreases. When this occurs the output voltage of the sensor circuit will drop in proportion to the decrease in distance between sense shoe S and workpiece W. This drop in voltage will decrease in a linear fashion the DC voltage at point B. As a result, the voltage at point C will become positive with respect to ground 34. The rise in positive potential at point C increases the voltage across variable potentiometer R22 of up motor driver circuit 20. Variable potentiometer R22 represents the sensitivity adjustment control. The increase in voltage across variable potentiometer R22 increases the base current to transistor Q8 which in turn switches transistor Q8 from its normally off condition to an on condition. Once transistor Q8 is switched on, transistor Q9 is switched from its normally on condition to a normally off condition raising the potential at the base of Q10 to the positive supply potential of power supply P2. This in turn switches transistor Q10 from its normally off condition to a normally on condition for energizing up relay UR. Up relay UR now has a completed electrical circuit from the positive terminal 100 of power supply P2 through up relay UR through the collector 98 to emitter 96 of transistor Q10 through resistor R29 to ground terminal 34 of the power supply P2. With up relay UR energized, up relay contact 92 in motor drive circuit 26 pulls in. Up relay contact 92 fires the Triac SC1 energizing motor M in a direction to raise torch T until the distance between sense shoe S and workpiece W is again at the desired predetermined height which will occur when the voltage at point C is equal to zero. To prevent overshoot the motor is damped by well known conventional means. Moreover, to avoid the possibility of oscillation or hunting from occurring, the operator can make the up motor driver circuit less sensitive to voltage variations by varying the sensitivity adjustment control potentiometer R22. At one extreme setting of variable potentiometer R22, the up motor driver circuit 20 is responsive to any variation in voltage at point C. Accordingly, the slightest rise in positive potential will cause a motor reaction. At the other extreme of the variable potentiometer R22, the up motor driver circuit 20 will be responsive only to a relatively large change in potential at point C. The sensitivity adjustment control is provided only for the up motor driver circuit 20. Although considered unnecessary, a second sensitivity adjustment control can be provided for the down motor driver circuit 22.

After the original torch to height setting is restored, let us assume that the torch T moves over a concave region in workpiece W. At this time the distance between sense shoe S and workpiece W is greater than the desired spacing. This will result in an increased output voltage from the sensor circuit increasing linearly the voltage at point B. The increased voltage at point B will result in turn in a decrease or negative potential at point C, the output of the comparator circuit 18, with respect to ground 34. A negative voltage at point C will turn on transistors Q11 and Q12 in the down motor driver circuit 22. An electrical circuit is then established through down relay DR from the negative terminal 78 of power supply P2 through down relay DR through the collector 72 to emitter 74 of transistor Q12 to ground terminal 34 of power supply P1. The energization of down relay DR pulls up down relay contact 94 in motor drive circuit 26 firing Triac SC2 and in turn energizing motor M in the opposite direction. The motor will drive the torch downward until a null or zero condition is again reestablished at point C.

If the torch T should be driven completely off the plate or workpiece W, the voltage output of the sensor circuit will rapidly rise. This will cause a likewise rapid increase in DC potential at point B which will in turn be reflected as a large decrease in voltage at point C with respect to ground 34 which would normally, as discussed above, result in energizing down relay DR. However, the signal from point B is simultaneously being applied to lost plate driver circuit 24 such that when the voltage at point B rises above the voltage across zener diode ZD1 transistors Q13 and Q14 will conduct to energize the lost plate relay LPR. A completed electrical circuit will then be established from the positive terminal 120 of power supply P3 through the lost plate relay LPR, through resistor R40 in series therewith, through the collector 112 to emitter 114 of transistor Q14, zener diode ZD1, variable resistor R31 to the negative terminal 122 of power supply P3. Variable resistor R31 represents the lost plate adjustment control which is manually adjustable by the operator. Varying this resistor affects the potential at which lost plate relay LPR will energize. Once the lost plate relay LPR is energized, it assumes direct control over motor M. This can be accomplished quite simply in a number of different ways. One simple way of having lost plate relay LPR assume control of motor M for a relatively large voltage increase at point B is, as shown in FIG. 3, by means of a pair of lost plate relay contacts 96 and 93 located in motor drive circuit 26. Lost plate relay contact 96 is placed in series with down relay contact 94. With lost plate relay LPR energized normally closed lost plate relay contact 96 opens disconnecting the line voltage to down relay contact 94. Hence, down relay DR is thereafter rendered ineffective for energizing the motor M. Normally opened lost relay contact 93 closes bypassing Triac SCR2 for supplying line voltage directly to motor M in a direction to raise torch T. Torch T will be driven upward until it is physically prevented from further movement by the torch assembly A. Although not shown, a switching circuit is employed to shut off motor M when torch T is fully retracted. After torch T has fully retracted, the operator must manually reposition the torch back to its desired height above workpiece W, but need not make any new adjustments in the height adjustment control, sensitivity adjustment control or lost plate adjustment control. The torch may be repositioned manually by depressing switch contact 124 in motor drive circuit 26. Normally opened switch contact 124 is ganged to normally closed switch contact 120.

What I claim is:

1. In an automatic height control system for controlling the spacing between a torch and an electrically conductive workpiece having: a high frequency excited sensor circuit including said workpiece as one element thereof and having another element thereof affixed to said torch for movement therewith, said sensor circuit defining a tuned resonance circuit, the output voltage of which varies in magnitude linearly with torch movements toward or away from said workpiece; detector means for converting said sensor output voltage into a DC varying voltage; comparator means for comparing said DC varying voltage with a DC reference voltage to produce an output signal equal to the difference therebetween; driving means responsive to the comparator output signal for moving said torch in a direction toward or away from said workpiece until said comparator output signal is zero wherein the improvement comprises: lost plate control means for automatically energizing said drive means, independent of said comparator output, in response to a predetermined output sensor voltage.

2. An automatic height control system as defined in claim 1 wherein said lost plate control means comprises means for automatically switching the driving means from the comparator output to a source of potential whereby said torch is automatically retracted to a predetermined height above the workpiece when the sensor circuit output voltage reaches said predetermined value.